Figure 1:
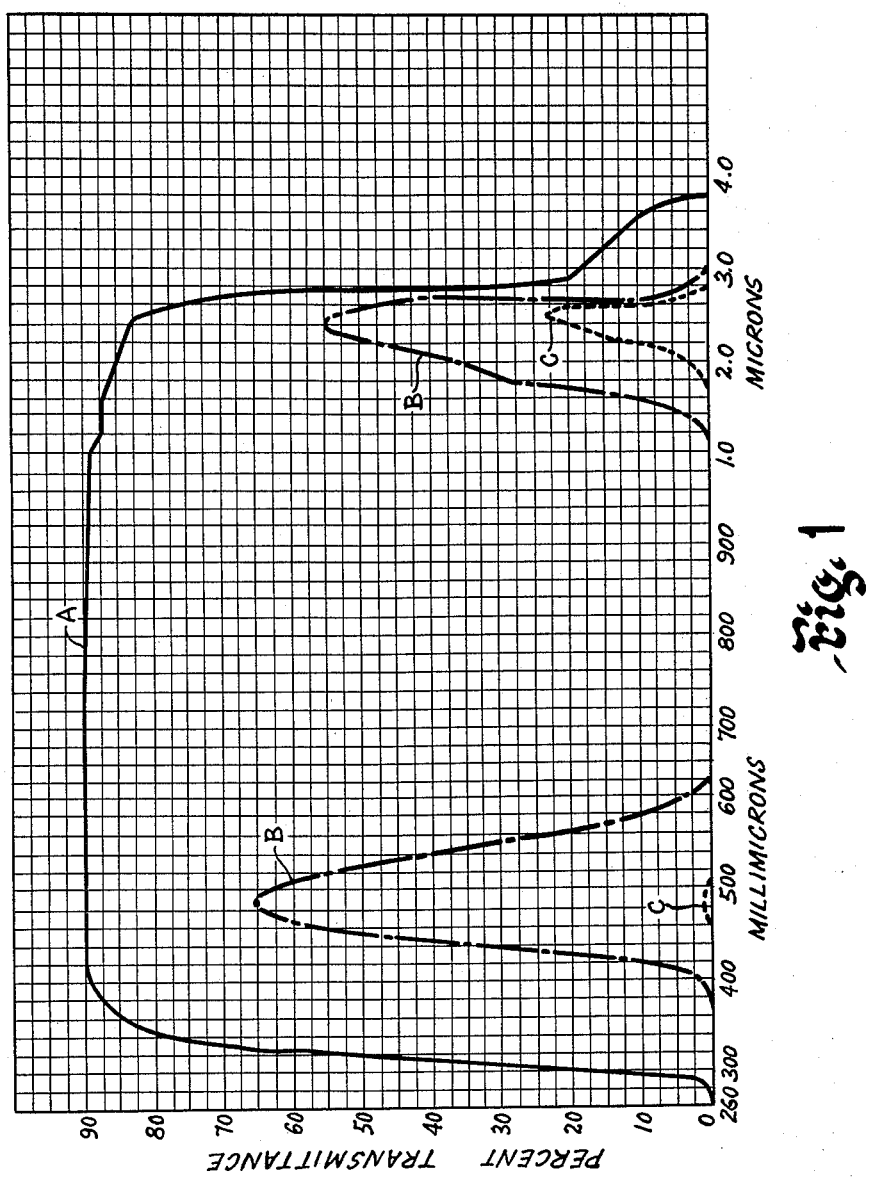

Nov. 17, 1959     L. O. UPTON     2,913,350
ABSORPTIVE GLASSES AND METHOD OF MAKING SAME
Filed Feb. 6, 1956     2 Sheets-Sheet 1

INVENTOR
LEE O. UPTON
BY
*Louis L. Gagnon*
ATTORNEY

United States Patent Office 2,913,350
Patented Nov. 17, 1959

2,913,350

ABSORPTIVE GLASSES AND METHOD OF MAKING SAME

Lee O. Upton, Sturbridge, Mass., assignor to American Optical Company, Southbridge, Mass., a voluntary association of Massachusetts Application February 6, 1956, Serial No. 563,720

14 Claims. (Cl. 117—33.3)

This invention relates to an improved glass composition and to glass resulting therefrom adapted particularly for use in forming welding plates or similar articles wherein the absorptive characteristics of the glass in the visible region of the spectrum is selectively controlled while simultaneously absorbing the ultra-violet and the near infra-red portions of the spectrum in accordance with the resultant characteristics desired of said plates or similar articles.

The invention disclosed herein is directed to an improved glass for use in making welding plates such as disclosed in co-pending application Serial No. 457,246, filed September 20, 1954 and now Patent No. 2,854,349.

A principal object of the invention is to provide a glass of the above character which is chemically stable particularly as to moisture attack at high humidity and high temperature and a novel method of making the same.

Another object is to provide a glass of the above character whose composition may be varied to produce glasses of different given shades within the range of from shade 2½ to shade 12½ and whose transmittance in the visible part of the spectrum will peak between 470 millimicrons and 490 millimicrons and more desirably at 480 millimicrons.

Another object is to provide a glass composition containing from 60% to 80% phosphorous pentoxide ($P_2O_5$), from 15% to 20% aluminum oxide ($Al_2O_3$), from 1.5% to 11.0% molybdenum trioxide ($MoO_3$), and from 1.0% to 7.0% cupric oxide (CuO) wherein given shades within said percentage limits may be obtained by maintaining a ratio of cupric oxide to molybdenum trioxide of approximately .7 to 1.

Another object is to provide glasses of the above nature whose basic composition is aluminum metaphosphate—$Al(PO_3)_3$—wherein the phosphorous pentoxide ($P_2O_5$) in the final chemical analysis of the glass is approximately 77.87% and the aluminum oxide ($Al_2O_3$) content is approximately 21.76%.

Another object is to provide glasses of the above character whose chemical analyses include phosphorous pentoxide ($P_2O_5$) ranging from 65.50% to 75.60%, aluminum oxide ($Al_2O_3$) from 17.18% to 20.30%, molybdenum trioxide ($MoO_3$) from 2.62% to 10.30% and cupric oxide (CuO) from 1.18% to 6.34%.

Another object is to provide improved glasses of the above character whose transmittance characteristics are controlled to function cooperatively with the transmittance characteristics of a metallic coating, preferably gold, applied thereto most desirably on the front surface thereof for the purpose of reflecting and thereby rejecting harmful infra-red radiations and which glasses peak at almost the same wavelength as does the gold coating and with said gold coating introducing only a negligible shift if any of the visible peak toward the green portion of the spectrum.

Many other objects as well as advantages to be gained from the invention will be pointed out and will become apparent from the description of the invention to follow. It is to be further understood that said description is not to be taken in any limiting sense but more as illustrative of how the invention may be practiced within the limits as defined by the accompanying claims.

Referring to the drawings:

Fig. 1 is a face view of a chart diagrammatically illustrating the transmittance curve of the basic aluminum metaphosphate glass in the ultra-violet, visible and infra-red regions of the spectrum and also diagrammatically illustrating the transmittance curve in said regions of the spectrum for a glass of the lightest shade desired and for a glass of intermediate shade. Said glasses all having an approximate thickness of 3 mms.

Figure 2:
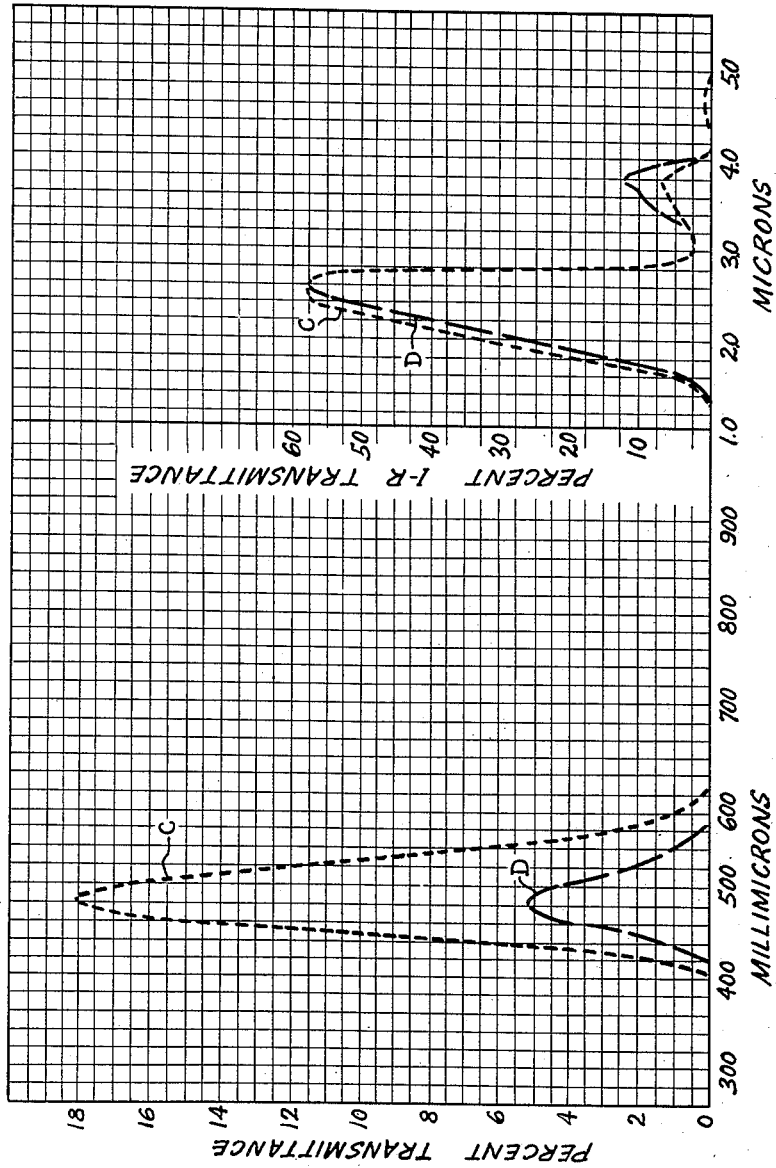

Fig. 2 is a view generally similar to Fig. 1 which, for greater ease of illustration, shows the transmittance curve in the same spectral region as taken from the specimen of intermediate shade set forth in chart 1 but taken from an intermediate specimen of approximately 1 mm. in thickness and further diagrammatically illustrating the transmittance curve in said same spectral region for the darkest shade of glass desired and taken from a specimen of approximately 1 mm. in thickness, the said chart, for ease of illustration, further showing the curves in the infra-red region as being compressed approximately 5 times the curves shown in the visible portion of the spectrum.

It has been found with known prior art welding plates, particularly those commonly used by welders utilizing helium or argon gas shielded arcs in welding aluminum and magnesium aluminum materials and for viewing the work for long sustained periods of time during said welding that the welder's eyes became irritated. This condition prevailed even when using prior art protective glasses several shades deeper than indicated necessary for the amperage and visible radiations of the welding arcs used. Welders also complained of a yellow flare light present in the arc or a blue haze or mist surrounding the work which obstructed the view of the wearer during the welding operation. It, therefore, is a primary object of this invention to improve upon and overcome the above problems through the provision of an improved glass and method of making the same whose peak transmittance is substantially at 4800 angstroms and which is designed particularly for use in combination with a thin metallic coating, preferably gold, placed on a side surface of said glass and which is adapted to function cooperatively therewith in introducing the infra-red absorptive characteristics desired while eliminating the blue haze and yellow flare mentioned above, as well as providing a clearer view of the work with much greater comfort to the wearer after prolonged use of the welding equipment. The invention is further directed to the provision of glasses of the above character which are particularly durable and stable from a physical point of view, that is, to chemical attack and to moisture attack at high humidity and high temperature.

The glasses of the invention basically embody as their major ingredients aluminum metaphosphate $Al(PO_3)_3$, having added thereto molybdenum trioxide and cupric oxide as colorants wherein different given shades are obtained by varying the related proportions of said colorants and with the ratio of cupric oxide to molybdenum trioxide, in each of said shades, being approximately .7 to 1.

The preferred range of shades, as taken from a specimen of each shade having a thickness of approximately 3 mm., is obtained by the following tables of batch compositions, one given in parts by weight and the other in percentages:

| Shade No. | Parts By Weight | | |
|---|---|---|---|
| | Al(PO₃)₃ | MoO₃ | CuO |
| 2.5 | 1,000 | 18.00 | 12.60 |
| 3.5 | 1,000 | 33.75 | 23.62(5) |
| 4.5 | 1,000 | 48.00 | 33.60 |
| 6.5 | 1,000 | 70.50 | 49.35 |
| 8.5 | 1,000 | 90.00 | 63.00 |
| 9.5 | 1,000 | 98.37(5) | 68.86 |
| 10.5 | 1,000 | 106.25 | 74.37(5) |
| 12.5 | 1,000 | 120.00 | 84.00 |

| Shade No. | Percent Oxide (Calculated) | | | |
|---|---|---|---|---|
| | P₂O₅ | Al₂O₃ | MoO₃ | CuO |
| 2.5 | 78.30 | 18.73 | 1.75 | 1.22 |
| 3.5 | 76.32 | 18.25 | 3.19 | 2.23 |
| 4.5 | 74.61 | 17.84 | 4.44 | 3.11 |
| 6.5 | 72.06 | 17.23 | 6.30 | 4.41 |
| 8.5 | 69.99 | 16.74 | 7.81 | 5.46 |
| 9.5 | 69.14 | 16.53 | 8.43 | 5.90 |
| 10.5 | 68.35 | 16.35 | 9.00 | 6.30 |
| 12.5 | 67.03 | 16.03 | 9.97 | 6.98 |

The chemical analysis of the basic glass without the colorants therein is phosphorous pentoxide ($P_2O_5$) approximately 77.87% and aluminum oxide ($Al_2O_3$) approximately 21.76%.

The chemical analysis of the glass resulting from light shade composition No. 2.5 is as follows:

Percent
Phosphorous pentoxide ($P_2O_5$) ---Approximately 75.60
Aluminum oxide ($Al_2O_3$) --------Approximately 20.30
Molybdenum oxide ($MoO_3$) ------Approximately 2.62
Cupric oxide (CuO) ---------------Approximately 1.18

The chemical analysis of the glass resulting from intermediate shade composition No. 8.5 is as follows:

Percent
Phosphorus pentoxide ($P_2O_5$) ----Approximately 68.38
Aluminum oxide ($Al_2O_3$) --------Approximately 17.18
Molybdenum oxide ($MoO_3$) -----Approximately 8.46
Cupric oxide (CuO) ---------------Approximately 5.25

The chemical analysis of the glass resulting from dark shade composition No. 12.5 is as follows:

Percent
Phosphorus pentoxide ($P_2O_5$) ----Approximately 65.50
Aluminum oxide ($Al_2O_3$) --------Approximately 17.40
Molybdenum oxide ($MoO_3$) -----Approximately 10.30
Cupric oxide (CuO) ---------------Approximately 6.34

From the lightest shade glass to the darkest shade glass given herein, the chemical analysis of the various glasses within said shades will embody the following related proportions of ingredients:

| | Percent |
|---|---|
| Phosphorous pentoxide ($P_2O_5$) | From approximately 65.50 to 75.60 |
| Aluminum oxide ($Al_2O_3$) | From approximately 17.18 to 20.30 |
| Molybdenum trioxide ($MoO_3$) | From approximately 2.62 to 10.30 |
| Cupric oxide (CuO) | From approximately 1.18 to 6.34 |

In the chart illustrated in Fig. 1, the solid line A illustrates the spectral transmittance curve of the substantially colorless basic aluminum metaphosphate glass. It will be noted that this glass has a relatively sharp cut-off in the intermediate or low ultra-violet region between 260 and 280 millimicrons, has substantially uniform high transmittance throughout the visible and near infra-red region of the spectrum and has a relatively sharp cut-off at about 3.7 microns. It is noted that the percentage of transmittance of this base glass is approximately 90%. The dot and dash line B illustrates the transmittance curve for the lightest shade glass resulting from 2.5 shade composition and as shown at the left of the chart has a relatively sharp peak of approximately 65% transmittance at about 480 millimicrons and has a relatively sharp cut-off at the ultra-violet end. The cut-off in the visible portion of the spectrum starts at about approximately 620 millimicrons and is opaque throughout the remainder thereof to approximately 1.2 microns where the glass begins to transmit in the infra-red.

The infra-red transmittance peaks at about 2.4 microns and said transmittance at said peak is approximately 55%. The glass has a relatively sharp cut-off at 3.0 microns and is thereafter opaque.

The said chart further illustrates, as shown by the short dash lines C, the transmittance curve of a desired intermediate shade of glass resulting from 8.5 shade composition. It is particularly pointed out that this glass also peaks at the 480 millimicron line, similar to the lightest shade, and has cut-offs in the visible region at approximately 460 millimicrons and at 518 millimicrons and from said 518 millimicron line is opaque throughout the remainder of the visible spectrum to approximately 1.6 microns where it starts to have transmittance in the infra-red region of the spectrum. The infra-red transmittance peaks at approximately 2.45 microns and the transmittance at said peak is approximately 22%. The glass then sharply cuts out at approximately 2.8 microns and is opaque at this wave length.

It is particularly pointed out that the above curves were plotted from a base glass specimen, from a lightest shade glass specimen and from an intermediate shade glass specimen all having a thickness of approximately 3 mms.

In Fig. 2, for ease of illustration, the specimen of intermediate shade whose transmittance curve C for a thickness of 3 mm. as shown in Fig. 1 was reduced to a thickness of approximately 1 mm. The dash line C, therefore, in the chart of Fig. 2 illustrates the transmittance of said intermediate shade having a thickness of 1 mm. It will be noted from the chart that with said 1 mm. thickness the glass of intermediate shade begins to transmit at between 408 and 410 millimicrons, peaks at approximately 480 millimicrons and has at said peak a transmittance of approximately 18%. The glass then has a cut-off in the visible portion of the spectrum at about 615 millimicrons, and is opaque throughout the remainder of the visible portion of the spectrum. It again transmits at 1.2 microns in the infra-red region of the spectrum and peaks in said region at approximately 2.45 microns. It has at said peak a transmittance of about 56%. For practical purposes, the glass then has a cut-off at approximately 3.0 microns.

On the chart, there is a curve D taken from the darkest shade desired and resulting from No. 12.5 shade composition and from a specimen approximately 1 mm. in thickness. This glass is opaque in the ultra-violet region of the spectrum and begins to transmit at approximately 420 millimicrons. It peaks at 480 millimicrons, and has a transmittance at said peak of approximately 5.2%. It again cuts off in the visible portion of the spectrum at approximately 560 millimicrons, is opaque throughout the remainder of the visible portion of the spectrum. It again begins to transmit at 1.25 microns in the infra-red region of the spectrum. This darkest shade has a peak transmittance in the infra-red region of approximately 56% at 2.6 microns and for practical purposes then cuts off at approximately 3.0 microns.

It is further pointed out that for ease of illustration the scale in the infra-red portion of the chart has been compressed approximately five times that of the scale given in the visible portion of the chart.

While the charts show the transmittance curve of a given light shade, intermediate shade, and dark shade of glass, it is to be understood that glasses of any desired shade between said given light shade and dark shade may be made by proper variance of the molybdenum trioxide and cupric oxide content.

It is also to be understood that lighter shades and darker shades of glass than those given may also be provided by proper control of the molybdenum trioxide and cupric oxide content. However, the shades between the lightest shade and darkest shade given are those which lie within the usual commercial range desired.

In forming welding plates with the glasses of the present invention and to obviate possible undesirable radiations of the infra-red while retaining the desired absorptive characteristics of the glass, a thin metallic coating preferably of gold is placed on one side surface of the glasses. Gold is preferred as it peaks in the visible region of the spectrum at substantially the same wave length as do the glasses of the present invention and brings about little, if any, appreciable shift in said peaking. If the peak transmittance should be shifted to the left of the peaking set forth herein, the undesirable blue haze surrounding the work, previously referred to, becomes apparent and if said peak transmittance is shifted to the right, the undesirable yellow flare, previously referred to, becomes apparent. The ideal peak transmittance, therefore, is as set forth herein and is in the blue-green region.

The above shades of glass are carefully controlled so that when said relatively thin coating of gold of controlled thickness is placed thereon, the shade numbers of the resultant plates or articles will be increased by approximately 1.5 shade numbers and will, therefore, be within the established commercial range of shades from 4 to 14.

It is further pointed out that glasses resulting from the batches as given in the above tables will all peak in the visible region of the spectrum at approximately 480 millimicrons and the related proportions of ingredients given therein are so controlled as to give the proper shades of glasses when of a thickness of approximately 3 mms. However, in order to discernibly reproduce the curves in the charts of the drawings, it was necessary to reduce the thickness of the intermediate shade specimen and the thickness of the darker shade specimen to approximately 1 mm. for, as illustrated in chart 1, the curve for the intermediate shade is practically indiscernible and the curve for the darker shade would be completely indiscernible. Here again, for practical illustration, the infra-red curves in Fig. 2 had to be compressed by a factor of five as compared with the scale in the visible portion of the chart.

It has been found by actual test that the glasses resulting from the above batches not only have improved transmittance characteristics but are particularly durable and stable to chemical attack and to conditions of high temperatures and high humidity and are, therefore, more desirable for use in the fabrication of welding plates of the character described.

While the transmittance in the darker shade glasses numbers 8.5 and 12.5, and the charted curves therefor, have been given for specimens of 1 mm. thickness, the calculated transmittance of said 12.5 shade at 3 mm. thickness is approximately .02%. The percent transmittance for specimens of said group of shades all having said approximate 3 mm. thickness and embodying the previously mentioned batch compositions will, therefore, lie within the range of from .02% to 65% transmittance at the 480 millimicron peak.

From the foregoing description, it will be apparent that simple, efficient and economical means and methods have been provided for obtaining all of the objects and advantages of the invention.

Having described my invention, I claim:

1. Light absorptive means of the character described comprising glass formed to different controlled shades ranging from a given light shade to a given dark shade and all of which have a chemical analyses including $P_2O_5$ from approximately 65.50% to 75.60%, $Al_2O_3$ from approximately 17.18% to 20.30%, $MoO_3$ from approximately 2.62% to 10.30% and CuO from approximately 1.18% to 6.34%.

2. Light absorptive means of the character described comprising glass elements embodying a range of shades including 2.5, 3.5, 4.5, 6.5, 8.5, 9.5, 10.5, 12.5 and intermediate shades within said range resulting from the heat-joining of base batch compositions which include from 60% to 80% $P_2O_5$, from 15% to 20% $Al_2O_3$, from 1.5% to 11% $MoO_3$, and from 1% to 7% CuO wherein the ratio of the CuO to the $MoO_3$ content is maintained at approximately .7 to 1 for each of said given shades.

3. A glass article of the character described which is particularly durable and stable as to chemical attack and moisture attack at high humidity and high temperature resulting from the combining of from 83.06% to 97.03% aluminum metaphosphate $Al(PO_3)_3$ and containing from 1.75% to 9.97% molybdenum trioxide ($MoO_3$) and from 1.22% to 6.98% cupric oxide (CuO) wherein the ratio of the cupric oxide to the molybdenum trioxide is substantially .7 to 1.

4. Base batch compositions for glasses of the character described ranging in shade numbers from 2.5 to 12.5 containing in percent oxide from approximately 67.03 to approximately 78.30 $P_2O_5$, from approximately 16.03 to approximately 18.73 $Al_2O_3$, from approximately 1.75 to approximately 9.97 $MoO_3$ and from approximately 1.22 to approximately 6.98 CuO.

5. A glass article whose chemical analysis comprises approximately 75.60% $P_2O_5$, 20.30% $Al_2O_3$, 2.62% $MoO_3$ and approximately 1.18% CuO.

6. A glass article whose chemical analysis comprises approximately 68.38% $P_2O_5$, 17.18% $Al_2O_3$, 8.46% $MoO_3$ and approximately 5.25% CuO.

7. A glass article whose chemical analysis comprises approximately 65.50% $P_2O_5$, 17.40% $Al_2O_3$, 10.30% $MoO_3$ and approximately 6.34% CuO.

8. Light absorbing means as set forth in claim 1 having a thin coating of gold on a side surface thereof of a thickness such as to increase the shade number of the light-absorbing means by approximately 1.5 shade and which peaks in the visible region of the spectrum at substantially the same wave length as said light absorbing means.

9. Light absorbing means as set forth in claim 2 having a thin coating of gold on a side surface thereof a thickness such as to increase the shade number of the light-absorbing means by approximately 1.5 shade and which peaks in the visible region of the spectrum at substantially the same wave length as said light absorbing means.

10. A glass article as set forth in claim 5 having a thin coating of gold on a side surface thereof of a thickness such as to increase the shade number of the glass article by approximately 1.5 shade.

11. A glass article as set forth in claim 6 having a thin coating of gold on a side surface thereof of a thickness such as to increase the shade number of the glass article by approximately 1.5 shade.

12. A glass article as set forth in claim 7 having a thin coating of gold on a side surface thereof of a thickness such as to increase the shade number of the glass article by approximately 1.5 shade.

13. Light-absorbing means as set forth in claim 1 having a thin coating of gold on a side surface thereof of a thickness such as to increase the shade number of the light-absorbing means by approximately 1.5 shade.

14. Light-absorbing means as set forth in claim 2 having a thin coating of gold on a side surface thereof of a thickness such as to increase the shade number of the light-absorbing means by approximately 1.5 shade.

(References on following page)

References Cited in the file of this patent

UNITED STATES PATENTS

| | | |
|---|---|---|
| 1,749,823 | Long | Mar. 11, 1930 |
| 1,961,603 | Berger | June 5, 1934 |
| 2,359,789 | Pincus | Oct. 10, 1944 |
| 2,390,191 | Stanworth | Dec. 4, 1945 |
| 2,434,281 | Moulton | Jan. 13, 1948 |
| 2,608,490 | Donahey | Aug. 26, 1952 |
| 2,753,271 | Treptow | July 3, 1956 |

FOREIGN PATENTS

| | | |
|---|---|---|
| 736,073 | Great Britain | Aug. 31, 1955 |